(12) United States Patent
Filsfils et al.

(10) Patent No.: US 8,488,444 B2
(45) Date of Patent: Jul. 16, 2013

(54) FAST REMOTE FAILURE NOTIFICATION

(75) Inventors: Clarence Filsfils, Brussels (BE); Stefano Previdi, Rome (IT); David Ward, Somerset, WI (US)

(73) Assignee: Cisco Technology, Inc., San Jose, CA (US)

( * ) Notice: Subject to any disclaimer, the term of this patent is extended or adjusted under 35 U.S.C. 154(b) by 838 days.

(21) Appl. No.: 11/824,885

(22) Filed: Jul. 3, 2007

(65) Prior Publication Data

US 2009/0010153 A1    Jan. 8, 2009

(51) Int. Cl.
*G01R 31/08* (2006.01)

(52) U.S. Cl.
USPC ............................................. 370/217; 370/231

(58) Field of Classification Search
USPC .................. 370/216, 217–229, 231, 235, 237, 370/351, 389, 395.2
See application file for complete search history.

(56) References Cited

U.S. PATENT DOCUMENTS

| | | | | |
|---|---|---|---|---|
| 6,678,241 B1 * | 1/2004 | Gai et al. | | 370/216 |
| 7,345,991 B1 * | 3/2008 | Shabtay et al. | | 370/221 |
| 2002/0071390 A1 * | 6/2002 | Reeves et al. | | 370/235 |
| 2004/0052207 A1 | 3/2004 | Charny et al. | | |
| 2005/0249123 A1 * | 11/2005 | Finn | | 370/242 |
| 2006/0002292 A1 * | 1/2006 | Chang et al. | | 370/225 |
| 2006/0007851 A1 * | 1/2006 | Appanna et al. | | 370/216 |
| 2006/0126496 A1 * | 6/2006 | Filsfils et al. | | 370/216 |
| 2006/0126502 A1 * | 6/2006 | Vasseur et al. | | 370/221 |
| 2006/0159011 A1 * | 7/2006 | Dalal et al. | | 370/220 |
| 2006/0209685 A1 * | 9/2006 | Rahman et al. | | 370/229 |
| 2007/0171817 A1 * | 7/2007 | Fujita et al. | | 370/225 |

FOREIGN PATENT DOCUMENTS

WO    WO 2006135282 A1 * 12/2006

OTHER PUBLICATIONS

Katz et al.,"Bidirectional Forwarding Detection", IETF Draft, draft-ietf-bfd-base-06.txt, Mar. 2007.

* cited by examiner

*Primary Examiner* — Michael Thier
*Assistant Examiner* — Curtis A Alia
(74) *Attorney, Agent, or Firm* — Cindy Kaplan

(57) ABSTRACT

A method and system for failure notification at a remote node in communication with a local node are disclosed. The local node is configured for faster failure detection than the remote node. In one embodiment, the method includes establishing a failure monitoring session between the local node and the remote node, receiving at the remote node, a failure notification from the local node, the failure notification sent using a protocol of the failure monitoring session, and rerouting traffic at the remote node in response to the failure notification.

20 Claims, 4 Drawing Sheets

FAST REMOTE FAILURE NOTIFICATION

BACKGROUND OF THE INVENTION

The present disclosure relates generally to failure notification in a computer network, and more specifically, fast remote failure notification.

As the Internet becomes a multi-media communications medium that is expected to reliably handle voice and video traffic, network protocols must also evolve to support quality-of-service (QoS) requirements such as latency and reliability and to provide guaranteed available bandwidths. Meeting the demands of businesses and consumers, however, also requires that bandwidth and latency guarantees continue to be met when failures occur. Protection mechanisms become necessary to ensure that services are restored within a sufficiently short time, e.g., 50 ms, such that the user experience is not affected.

To address this requirement, various "Fast Reroute" techniques have been developed that provide rapid reaction to a failure such that the user experience is preserved. In a network employing Fast Reroute, traffic flowing through a failed link or node is rerouted through one or more preconfigured backup tunnels or alternate paths. Redirection of the impacted traffic occurs very quickly to minimize impact on the user experience, typically in tens of milliseconds.

A drawback with conventional systems is that when a node does not support fast failure notification, technologies such as Fast Reroute cannot be deployed.

DESCRIPTION OF EXAMPLE EMBODIMENTS

Overview

A method and system for failure notification at a remote node in communication with a local node are disclosed. The local node is configured for faster failure detection than the remote node. In one embodiment, the method generally comprises establishing a failure monitoring session between the local node and the remote node, receiving at the remote node, a failure notification from the local node, the failure notification sent using a protocol of the failure monitoring session, and rerouting traffic at the remote node in response to the failure notification.

In another embodiment, the method generally comprises establishing one or more failure monitoring sessions between the local node and the remote node, identifying a failure, and transmitting a failure notification from the local node to the remote mode using the one or more failure monitoring sessions.

Example Embodiments

The following description is presented to enable one of ordinary skill in the art to make and use the invention. Descriptions of specific embodiments and applications are provided only as examples and various modifications will be readily apparent to those skilled in the art. The general principles described herein may be applied to other embodiments and applications without departing from the scope of the invention. Thus, the present invention is not to be limited to the embodiments shown, but is to be accorded the widest scope consistent with the principles and features described herein. For purpose of clarity, details relating to technical material that is known in the technical fields related to the invention have not been described in detail.

A method and system described herein allow a node to signal to a neighbor node the failure of one of its components. The neighbor node may be locally or remotely connected to the signaling node, depending on the protocol configuration. The failure may be of one of the neighbor node's local interfaces or links, or other component impacting communication at the neighbor node. After receiving notification of a failure, the neighbor node can reroute traffic (e.g., trigger a Fast Reroute or Fast Convergence process). This allows a node without fast failure detection mechanisms to rely on neighbor nodes to quickly signal failures to the node.

Figure 1:
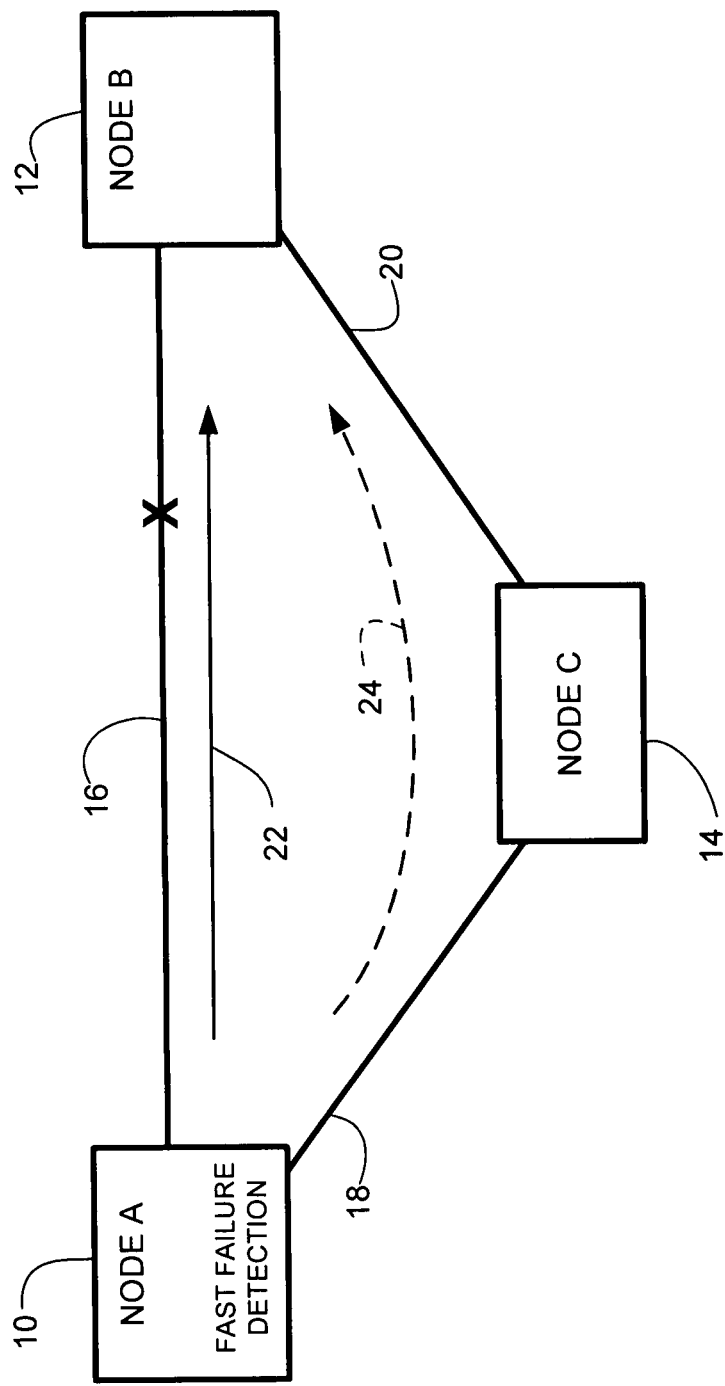
FIG. 1 illustrates an example of a network in which embodiments described herein may be implemented.

Referring now to the drawings, and first to FIG. 1, an example of a network that may implement embodiments described herein is shown. For simplification, only a small number of nodes are shown. The system operates in the context of a data communication network including multiple network elements. Some of the elements in a network that employs the system may be network devices such as routers or switches. The network device may include, for example, a master central processing unit (CPU), interfaces, and a bus. The CPU preferably includes memory and a processor. The network device may be implemented on a general purpose network machine such as described below with respect to FIG. 4.

The network shown in the example of FIG. 1 includes three nodes A, B, C (10, 12, 14). The nodes may be routers or other network elements. It is to be understood that any number of nodes (e.g., routers, switches, gateways) may be located between the nodes or connected to the nodes. Node A (local node) and node B (remote node) are coupled by link 16, node C is coupled to node A by link 18, and node B is coupled to node C by link 20. Link 16 provides a primary path 22 from node A to node B. An alternate (backup, repair) path for data transmitted from node A to node B is provided at path 24 (through node C). Node A is configured with a fast failure detection mechanism and uses a failure notification system to quickly notify node B of a failure so that node B can initiate a fast reroute or convergence process. For example, upon identifying a failure at link 16, node A reroutes traffic to backup path 24 and notifies node B of the failure via path 24. The failure notification is sent using a failure monitoring session established between node A and node B, as described in detail below.

Figure 2:
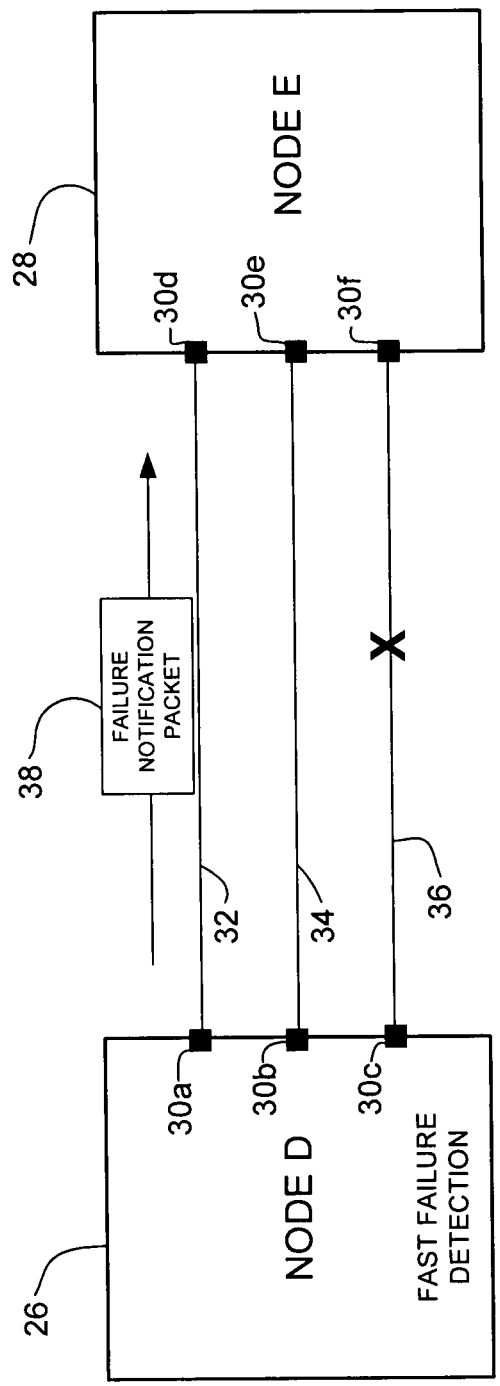
FIG. 2 illustrates transfer of a failure notification packet between nodes having multiple links.

FIG. 2 illustrates the transfer of a failure notification packet 38 between two nodes (local node D (26) and remote node E (28)) having multiple links 32, 34, 36 therebetween. Node D includes a plurality of interfaces 30a, 30b, 30c corresponding to links 32, 34, 36, respectively. Node E includes interfaces 30d, 30e, 30f, corresponding to links 32, 34, 36, respectively. In this example, node D is configured with a fast failure detection mechanism. Upon identifying a failure at link 36, node D sends failure notification packet 38 to node E via link 32 using a failure monitoring session established between node D and node E. As described in detail below, the system may be used to notify node E of a failure at any one of the interfaces using a single failure monitoring session or multiple failure monitoring sessions. Also, as described below, the failure may be identified by means other than the failure monitoring session used to notify the remote node of the failure. Thus, the term "failure monitoring session" as used herein includes any type of session that may be used to transmit a failure notification to a remote node.

In one embodiment, the failure monitoring session utilizes Bidirectional Forwarding Detection (BFD) protocol to notify the remote node of a failure, and in some cases detect faults between nodes. BFD detects faults in the bidirectional path between two forwarding engines (e.g., nodes A and B in FIG. 1 or node D and node E in FIG. 2), including physical interfaces, subinterfaces, data links, and to the extent possible the forwarding engines themselves. The nodes may be configured to support various protocols including, for example, BGP (Border Gateway Protocol), EIGRP (Enhanced Interior Gateway Routing Protocol), IS-IS (Intermediate System-to-Intermediate System), OSPF (Open Shortest Path First), or HSRP (Hot Standby Router Protocol). These protocols receive forwarding path detection failure messages from BFD.

BFD is configured on both the local and remote nodes. In one example, the local node (e.g., node A of FIG. 1) is configured to support BFD for failure detection within approximately 30 ms. The remote node (node B) also supports BFD, but only for failure detection within approximately 3*200 ms. A Service Provider (SP) may want node B to trigger Fast Reroute (FRR) upon a failure in primary path 22 in less than 100 ms. As previously described, the system and method allow for Fast Reroute at node B by using node A to notify node B of the failure. It is to be understood that the time intervals listed above are only provided as examples. The system may be used with any two nodes, wherein one node (referred to herein as the local node) is configured for faster failure detection than the other node (referred to herein as the remote node).

During an initial BFD session setup, BFD on each router forms a BFD control packet. These packets are sent to the neighbor (peer) node until a BFD session is established. The initial packet includes a discriminator (My Discriminator) set to a value which is unique on the transmitting router (or interface, as described below). After the remote router receives a BFD control packet during the session initiation phase, it will copy the value of the "My Discriminator" field into its own "Your Discriminator" field. Once both systems see their own discriminator in each other's control packets, the session is established. The discriminator values may also be used to multiplex/demultiplex sessions if there are multiple BFD connections between a pair of BFD peers.

Once BFD has been enabled on the interfaces and at the router level for the appropriate routing protocols, a BFD session is created. The system preferably operates in asynchronous mode and uses an Echo function at the node with the faster failure detection (i.e., local node). A stream of Echo packets is sent from the local (originating) node, and the remote node sends the packets back to the originating node via its forwarding plane. When using the Echo function, the originating node controls response times. As long as the node receives a BFD packet within a detect-timer period, the BFD session remains up and any routing protocol associated with BFD maintains its adjacencies. If a number of packets of the echoed data stream are not received, the session is declared to be down and the local node informs any routing protocols of that BFD session about the failure. The local node reroutes traffic (e.g., initiate a Fast Reroute or convergence process) to bypass the failed link, node, or interface. The local node then sends a failure notification packet to the remote node to notify the node of the failure so that the remote node can initiate rerouting traffic (e.g., fast reroute or convergence) without waiting on its slower failure detection to identify the failure.

The BFD control packet format may be as described in IETF Internet Draft "Bidirectional Forwarding Detection", draft-ietf-bfc-base-06.txt, D. Katz et al., March 2007, which is incorporated herein by reference in its entirety.

The embodiment shown in FIG. 1 and described above uses a single multihop BFD session to notify a neighbor node of a node or link failure. The following embodiments allow a local node configured for fast failure detection to signal individual failure detections (i.e., of a specific interface or specific link in the case of multiple links between nodes) to a remote node.

In one embodiment, BFD may be extended so that it can handle multiple interfaces (i.e., monitor liveliness of interfaces) through a single BFD session (FIG. 2). A unique identifier (discriminator) is assigned on a per-interface basis while the source and destination addresses used for the session are the addresses for the nodes through which the BFD session is established. BFD packets exchanged across the single multihop session are used to transfer the interface IDs between the local and remote nodes. Once these interface IDs are passed, and once the local node detects a failure on one of its interfaces to the remote node, it signals the interface ID as down to the remote node, so that the remote node can take appropriate actions. With this extension, a single BFD session may be used to signal a remote failure on an interface different than the interface on which the BFD session is established. For example, referring to FIG. 2, a single BFD session is established between node D and node E on link 32. Each interface (or link) has its own discriminator (ID). If a failure is detected on interface 30c, node D sends a failure notification packet 38 to node E over link 32 identifying a failure at interface 30c using the discriminator value for interface 30c. The failure of the interface may be detected by various means, and in this case, the failure monitoring session (e.g., BFD) is not used to detect the failure.

In another embodiment, multiple interfaces can be monitored through separate BFD sessions. Each BFD session has a distinct discriminator, but uses the same source and destination addresses. Associations are created between the multiple sessions so that in one session, a notification of a failure in another session can be signaled. For example, referring again to FIG. 2, BFD sessions are established between node D and node E on link 32, link 34, and link 36. Each session is assigned its own distinct discriminator (identifier). Upon receiving notification of a failure at link 36 at node D, node D uses one of the other BFD sessions (e.g., session over link 32) to send a failure notification packet 38 to node E. The failure notification packet uses the distinct discriminator to identify the failure at link 36. The failure at link 36 may be identified by the BFD session over link 36 or other means.

In one embodiment, the following process is used to provide a discriminator per interface in the BFD session. Each router first advertises in a BFD Hello packet the following information:

IP Subnet, Discriminator-ID.

Each router then builds and maintains a neighbor table where for each neighbor (in addition to typical BFD information), the following is included:

Local Intf ID, IP Subnet, Local Discr, Remote Discr.

The local and remote discriminators are mapped based on the inspection of the IP subnet shared among local and remote nodes.

When the local router detects a local failure on one of its interfaces it signals to the remote router the failure using a BFD packet including the local discriminator of the failed interfaces. The remote router will map the received discriminator on its table and determine which interface has failed.

Figure 3:
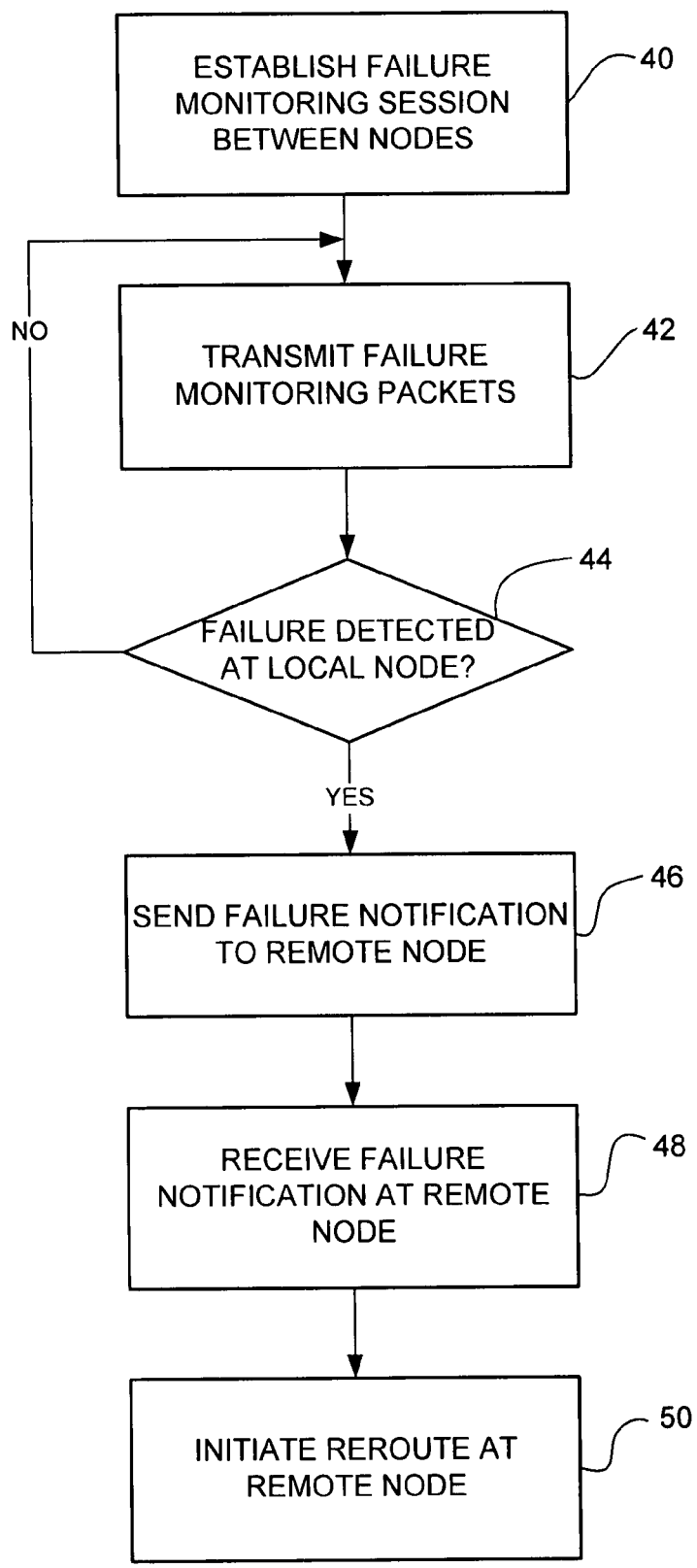
FIG. 3 is a flowchart illustrating a process for fast remote failure notification, in accordance with one embodiment.

FIG. 3 is a flowchart illustrating a process for fast remote failure notification in accordance with one embodiment. At step 40, a failure monitoring session (e.g., multihop BFD session) is established between a local node and a remote node over a link (e.g., between nodes A and B over primary path 22 of FIG. 1). The local node has a precomputed backup (repair) path (e.g., path 24) which does not use the primary path. If more than one link exists between two nodes, multiple sessions may be established to monitor each one of the links or a single BFD session may be used, as previously described with respect to FIG. 2. After the session is established, the local node sends failure monitoring packets (e.g., BFD control packets) to the remote node at a specified time interval (step 42). Upon identifying a failure affecting communication at the remote node, the local node reroutes traffic to the backup path and transmits a failure notification (e.g., BFD multihop session packet) to the remote node (steps 44 and 46). As previously described, the failure may be detected by the failure monitoring session or by other means. The failure notification may be sent on a backup path (e.g., path 24 of FIG. 1) or another link extending between the local and remote nodes (FIG. 2), for example. The failure notification may also be sent on the path over which the original BFD session was established if the notification is for a failure on a different interface. The remote node receives the failure notification from the local node (step 48) and initiates local protection of the failed component (step 50).

Upon receiving notification of the failure, the remote node may use various mechanisms in order to rapidly reroute traffic. (It is to be understood that the term "reroute traffic" as used herein includes reroute or convergence processes). For example, as soon as the remote node receives notification of a link failure, it may remove the associated interface from an IGP (Interior Gateway Protocol) adjacency database and trigger fast convergence. The remote node may also trigger Fast Reroute and reroute all traffic passing through a failed link towards a precomputed backup (repair) path. It is to be understood that these are only examples and that the remote node may perform other processes to recover from the failure, as is well known by those skilled in the art.

The above examples utilize BFD, however, it is to be understood that other protocols may be used for failure notification, without departing from the scope of the invention. For example, when a local node detects the failure of a remote node's component or interface it may signal the failure through the transmission of an IGP hello packet with appropriate content that will trigger in the remote node the removal of the adjacency. In one example IGP flooding is used so that a local node immediately floods a new LSA/LSP (Link State Advertisement/Link State Packet) to the entire area stating the adjacency when the neighbor node is down. (In this example, IGP is the failure monitoring session). In an IS-IS example, the hello packet will not contain the remote node ID so that the remote node will consider the adjacency to be dropped.

Figure 4:
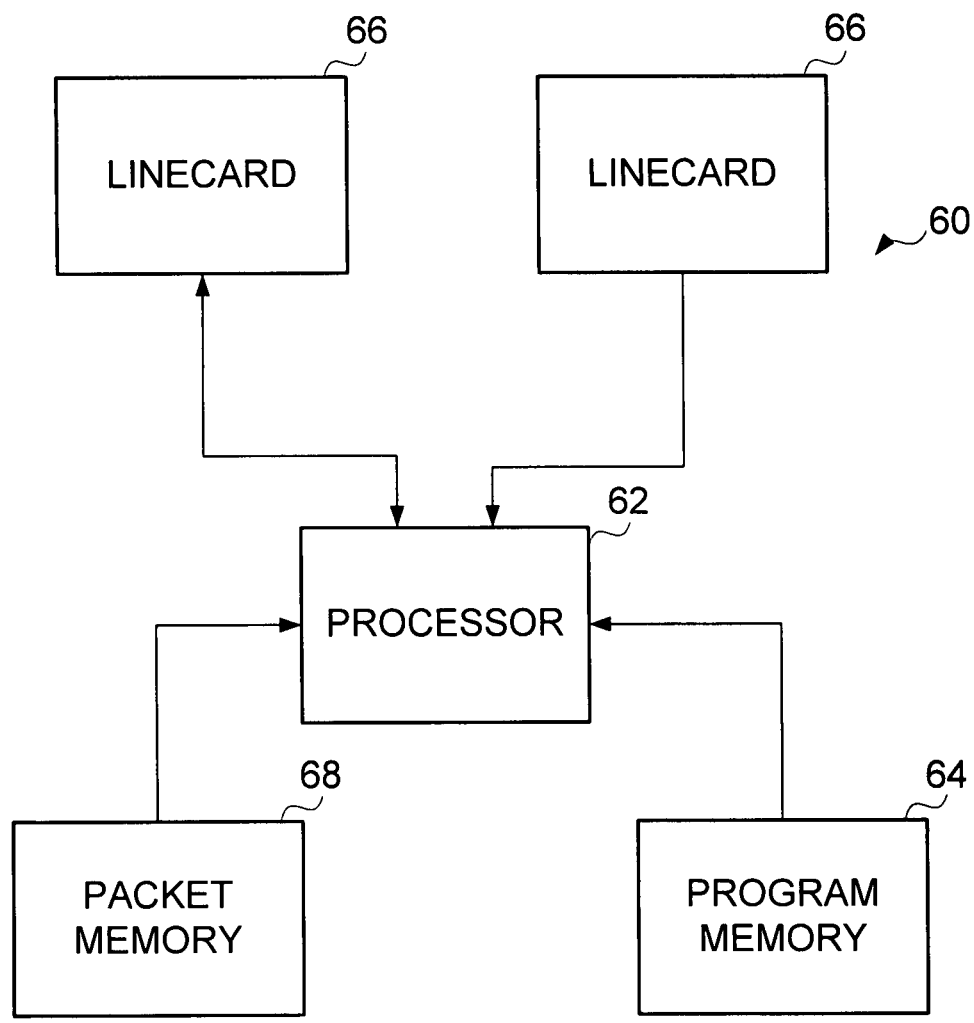
FIG. 4 depicts an example of a network device useful in implementing the embodiments described herein.

FIG. 4 depicts a network device 60 that may be used to implement the fast remote failure notification system described herein. In one embodiment, network device 60 is a programmable machine that may be implemented in hardware, software, or any combination thereof. A processor 62 executes codes stored in a program memory 64. Program memory 64 is one example of a computer-readable medium. Program memory 64 can be a volatile memory. Another form of computer-readable medium storing the same codes would be some type of non-volatile storage such as floppy disks, CD-ROMs, DVD-ROMs, hard disks, flash memory, etc.

Network device 60 interfaces with physical media via a plurality of linecards 66. Any number of linecards 66 may be used and each linecard may include numerous separate physical interfaces. Linecards 66 may incorporate DSL interfaces, Ethernet interfaces, Gigabit Ethernet interfaces, 10-Gigabit Ethernet interfaces, Frame relay interfaces, ATM interfaces, SONET interfaces, dial-up interfaces, wireless interfaces, etc. The various components are interconnected by a backplane. As packets are received, processed, and forwarded by network device 60, they may be stored in a packet memory 68.

As can be observed from the foregoing, the system and method described herein provide numerous advantages. For example, the system and method deliver fast failure detection to routers not supporting fast failure detection. This allows a service provider to deliver FRR services, even if routers which do not support fast failure notification are deployed, by relying on remote failure notification.

Although the present invention has been described in accordance with the embodiments shown, one of ordinary skill in the art will readily recognize that there could be variations made to the embodiments without departing from the scope of the present invention. Accordingly, it is intended that all matter contained in the above description and shown in the accompanying drawings shall be interpreted as illustrative and not in a limiting sense.

What is claimed is:

1. A method for failure notification at a remote node in communication with a local node, the method comprising:
   establishing a failure monitoring session between the local node and the remote node, the local node comprising a failure detector that allows the local node to detect a failure between the local node and the remote node faster than a failure detector at the remote node is operable to detect said failure;
   receiving at the remote node, a failure notification from the local node, the failure notification sent using a protocol of the failure monitoring session; and
   rerouting traffic at the remote node in response to the failure notification.

2. The method of claim 1 wherein establishing said failure monitoring session comprises establishing a Bidirectional Forwarding Detection (BFD) session.

3. The method of claim 2 wherein receiving the failure notification comprises receiving a failure notification packet from a backup path extending from the local node to the remote node.

4. The method of claim 1 further comprising assigning a unique identifier to each interface at the remote node, wherein said failure notification indicates a failure on a link associated with one of said interfaces.

5. The method of claim 1 wherein establishing said failure monitoring session comprises establishing multiple failure monitoring sessions between the local node and the remote node and assigning a unique identifier to each session, each of said failure monitoring sessions associated with a different interface.

6. The method of claim 1 wherein rerouting the traffic at the remote node comprises initiating a Fast Reroute at the remote node.

7. The method of claim 1 wherein rerouting the traffic at the remote node comprises initiating a convergence process at the remote node.

8. An apparatus for failure notification at a remote node in communication with a local node, the apparatus comprising: a processor configured for establishing a failure monitoring session between the local node and the remote node, receiving a failure notification from the local node, the failure notification sent using a protocol of the failure monitoring session, and rerouting traffic at the remote node in response to the failure notification; and memory for storing a local node identifier and a remote node identifier;

wherein the local node comprises a failure detector that allows the local node to detect a failure between the local node and the remote node faster than the remote node is operable to detect said failure.

9. The apparatus of claim 8 wherein the memory is configured for storing an identifier for each interface at the remote node, wherein said failure notification indicates a failure on a link associated with one of said interfaces.

10. The apparatus of claim 8 wherein said identifiers are Bidirectional Forwarding Detection (BFD) discriminators.

11. The apparatus of claim 8 wherein establishing said failure monitoring session comprises establishing multiple failure monitoring sessions between the local node and the remote node and assigning a unique identifier to each session, each of said failure monitoring sessions associated with a different interface.

12. A method for providing failure notification to a remote node in communication with a local node, the method comprising:

establishing one or more failure monitoring sessions between the local node and the remote node, the local node comprising a failure detector that allows the local node to detect a failure between the local node and the remote node faster than the remote node is operable to detect said failure;

identifying a failure at the local node; and transmitting a failure notification from the local node to the remote mode using the one or more failure monitoring sessions.

13. The method of claim 12 wherein establishing said one or more failure monitoring sessions comprises establishing one or more Bidirectional Forwarding Detection (BFD) sessions.

14. The method of claim 13 further comprising transmitting echo packets to the remote mode to monitor a connection between the local node and the remote node.

15. The method of claim 12 wherein identifying said failure comprises identifying said failure using said failure monitoring session in a connection between the local node and the remote node, the failure monitoring session established over said connection.

16. The method of claim 12 wherein said local node failure detector is configured to identify said failure without using said failure monitoring session.

17. The method of claim 12 wherein establishing said one or more failure monitoring sessions comprises assigning a unique identifier to each of said one or more failure monitoring sessions, each of said failure monitoring sessions associated with a different interface.

18. The method of claim 12 further comprising rerouting traffic to the remote node after identifying said failure.

19. An apparatus for providing failure notification to a remote node in communication with a local node, the apparatus comprising:

means for establishing one or more failure monitoring sessions between the local node and the remote node, the local node comprising a failure detector that allows the local node to detect a failure between the local node and the remote node faster than the remote node is operable to detect said failure;

means for identifying a failure; and means for transmitting a failure notification from the local node to the remote mode using the one or more failure monitoring sessions.

20. The apparatus of claim 19 wherein said failure monitoring session is a Bidirectional Forwarding Detection (BFD) session and the failure detector at the local node is configured to support BFD for failure detection faster than a failure detector at the remote node.

\* \* \* \* \*